(12) United States Patent
Nespolo et al.

(10) Patent No.: US 9,799,223 B2
(45) Date of Patent: Oct. 24, 2017

(54) SYSTEMS AND METHODS FOR ALERTING DRIVERS THAT THEY HAVE ENCROACHED A SAFETY ZONE OF ANOTHER VEHICLE

(71) Applicant: DENSO International America, Inc., Southfield, MI (US)

(72) Inventors: Martin Nespolo, Grosse Pointe Woods, MI (US); Yu Zhang, Farmington Hills, MI (US); Thomas Krzyzak, Jr., Livonia, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/962,804

(22) Filed: Dec. 8, 2015

(65) Prior Publication Data

US 2017/0162054 A1    Jun. 8, 2017

(51) Int. Cl.
*G08G 1/16* (2006.01)
*B60Q 5/00* (2006.01)
*B60Q 1/52* (2006.01)

(52) U.S. Cl.
CPC .............. *G08G 1/166* (2013.01); *B60Q 1/525* (2013.01); *B60Q 5/006* (2013.01)

(58) Field of Classification Search
CPC ......... G08G 1/166; B60Q 1/525; B60Q 5/006
See application file for complete search history.

(56) References Cited

U.S. PATENT DOCUMENTS

| 2012/0306664 A1* | 12/2012 | Geter | G08G 1/166 340/903 |
| 2013/0093582 A1* | 4/2013 | Walsh | G08G 1/167 340/436 |
| 2015/0314783 A1* | 11/2015 | Nespolo | B60W 30/0953 701/301 |

FOREIGN PATENT DOCUMENTS

JP    H06201830 A    7/1994

* cited by examiner

*Primary Examiner* — Leon Flores
(74) *Attorney, Agent, or Firm* — Harness, Dickey & Pierce, P.L.C.

(57) ABSTRACT

Methods and systems for a subject vehicle to alert a driver of a secondary vehicle that the secondary vehicle has encroached a safety zone of the subject vehicle or another secondary vehicle. Sensors are configured to identify the location of the secondary vehicle. A controller is in receipt of inputs from the sensors and is configured to determine whether the secondary vehicle has encroached the safety zone of the subject vehicle or another secondary vehicle. A warning system is configured to warn the driver of the secondary vehicle that the secondary vehicle has encroached the safety zone of the subject vehicle or another secondary vehicle. The controller activates the warning system when the controller determines that the secondary vehicle has encroached the safety zone of the subject vehicle or another secondary vehicle.

20 Claims, 3 Drawing Sheets

SYSTEMS AND METHODS FOR ALERTING DRIVERS THAT THEY HAVE ENCROACHED A SAFETY ZONE OF ANOTHER VEHICLE

FIELD

The present disclosure relates to systems and methods for alerting drivers that they have encroached a safety zone of another vehicle.

BACKGROUND

This section provides background information related to the present disclosure, which is not necessarily prior art.

More and more vehicles are being equipped with advanced driver assistance systems (ADAS), which help drivers safely operate their vehicles. ADAS systems are able to alert the driver of hazards to help the driver avoid a collision, for example. While current ADAS systems are suitable for their intended use, they are subject to improvement. The present teachings promote enhanced driving safety by providing systems for alerting drivers that they have encroached the safety zone of a subject vehicle.

SUMMARY

This section provides a general summary of the disclosure, and is not a comprehensive disclosure of its full scope or all of its features.

The present teachings provide for methods and systems for a subject vehicle to alert a driver of a secondary vehicle that the secondary vehicle has encroached a safety zone of the subject vehicle or another secondary vehicle. An exemplary system includes sensors configured to identify the location of the secondary vehicle. A controller is in receipt of data collected by the sensors and is configured to determine whether the secondary vehicle has encroached the safety zone of the subject vehicle or another secondary vehicle. A warning system is configured to warn the driver of the secondary vehicle that the secondary vehicle has encroached the safety zone of the subject vehicle or another secondary vehicle. The controller activates the warning system when the controller determines that the secondary vehicle has encroached the safety zone of the subject vehicle or another secondary vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure. Corresponding reference numerals indicate corresponding parts throughout the several views of the drawings.

Figure 5:
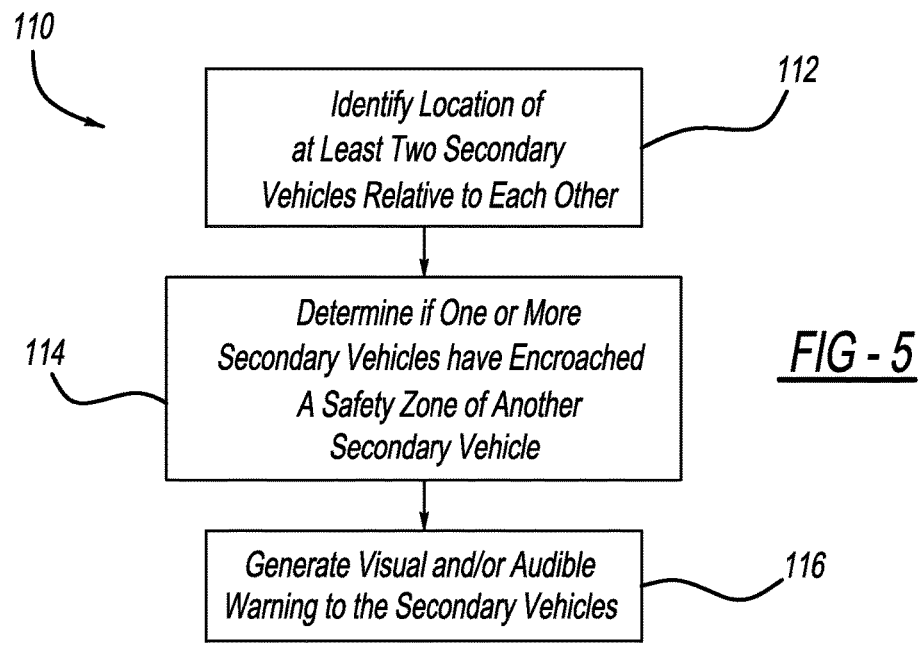
Figure 6:
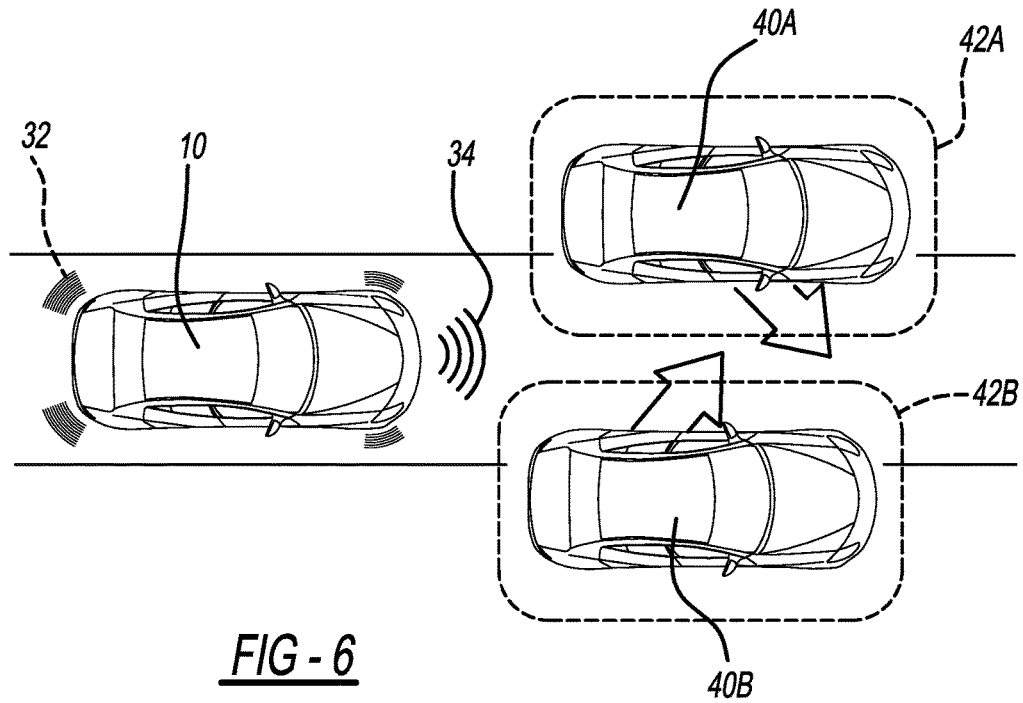

FIG. 5 illustrates a method according to the present teachings whereby a subject vehicle alerts secondary vehicles that one or more of the secondary vehicles has encroached the safety zone of another secondary vehicle; and FIG. 6 illustrates two secondary vehicles encroaching each other's safety zone, and a subject vehicle including the systems and methods according to the present teachings alerting the secondary vehicles of the encroachment.

DETAILED DESCRIPTION

Example embodiments will now be described more fully with reference to the accompanying drawings.

Figure 1:
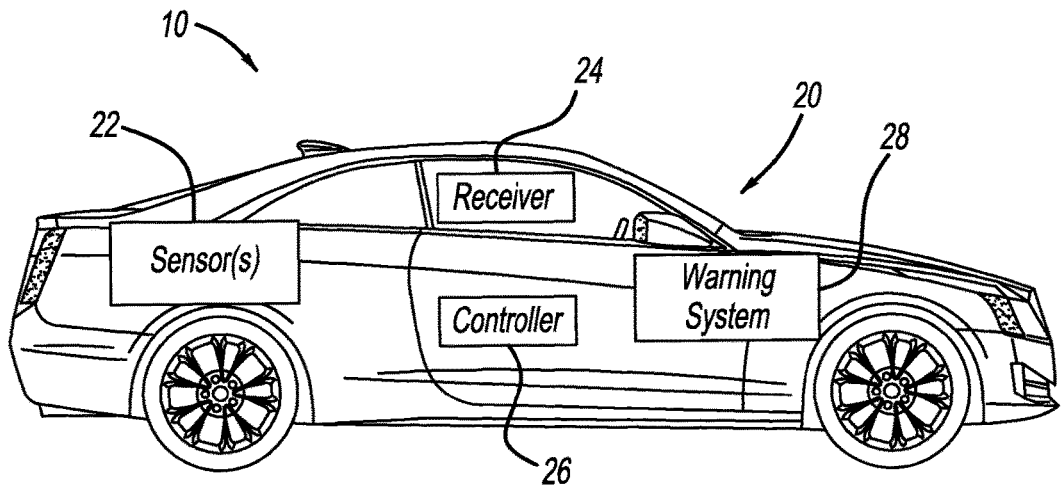
FIG. 1 illustrates an exemplary vehicle including a system according to the present teachings for alerting drivers that they have encroached a safety zone of another vehicle.

With initial reference to FIG. 1, a subject or primary vehicle 10 including a system 20 according to the present teachings is illustrated. Although the subject vehicle 10 is illustrated as a passenger vehicle, the present teachings apply to any suitable vehicle. The present teachings thus apply to passenger vehicles, mass transit vehicles, military vehicles, construction vehicles, mining vehicles, watercraft, and aircraft, for example.

When the subject vehicle 10 is outfitted with the system 20, the system 20 alerts a driver of a secondary vehicle (illustrated at 40A in FIG. 2, for example), which can be any other suitable vehicle proximate to the subject vehicle 10, that the secondary vehicle 40A has encroached a safety zone (illustrated in FIG. 3 at reference numeral 30, for example) of the subject vehicle 10, or a safety zone of another secondary vehicle (FIG. 6 illustrates two secondary vehicles 40A and 40B, and respective safety zones 42A and 42B thereof). The system 20 generally includes sensors 22, a transmitter/receiver 24, a controller 26, and a warning module/system 28.

The sensors 22 are configured to determine, in general, position of the secondary vehicle 40A relative to the subject vehicle 10, and/or position of two secondary vehicles 40A and 40B relative to one another. The sensors 22 are further configured to determine at least one or more of the following: position of one or more of the vehicles 10, 40A, 40B on a roadway; type and size of secondary vehicles; traffic conditions; whether obstructions are present in or near the roadway (such as whether an animal is in the road or the road is blocked by debris or some other obstacle); and environmental conditions, such as condition of the roadway (e.g., whether the roadway is icy or otherwise slippery). The sensors 22 can thus include one or more of the following types of sensors: lane detection sensors; traffic condition sensors; speed sensors; environmental condition sensors, such as road condition sensors, temperature sensors, pressure sensors, etc.; road obstacle sensors; and surrounding vehicle sensors configured to determine vehicle size and type. The sensors 22 can be any sensors suitable for performing these functions, and can include one or more of a camera, radar, sonar, and lidar, for example. The sensors 22 can be mounted at any suitable location about the subject vehicle 10.

The system 20 further includes any suitable receiver 24. The receiver 24 can be configured to receive, for example, traffic information, weather information, road condition information, obstacle information, or any other information useful for setting one or more of the safety zones 30, 42A, and 42B. The receiver 24 can be any suitable receiver, such as a radio frequency receiver or a GPS receiver, for example.

The controller 26 is in receipt of inputs from the sensors 22 and the receiver 24. Based on these inputs, the controller 26 is configured to set the safety zones 30, 42A, or 42B at any suitable distance from the vehicle associated therewith. For example, if based on inputs from the sensors 22 and/or the receiver 24, the controller 26 determines that traffic is heavy and vehicles are operating at reduced speeds with reduced spacing therebetween, the controller 26 can set the safety zones 30, 42A, or 42B to be closer to the vehicles 10, 40A, 40B. The system 20 is therefore able to distinguish between situations where vehicles are close together due to a traffic jam versus a potential collision situation. If based on inputs from the sensors 22 and/or the receiver 24 the controller determines that traffic is light, the controller can set the safety zones 30, 42A, or 42B to extend further from the vehicles 10, 40A, 40B.

The controller 26 may also decrease the size of the safety zones 30, 42A, or 42B to take into account any additional stopping distance that may be required due to road conditions, such as if ice is detected on the road. As another example, if based on inputs thereto the controller 26 determines that the subject vehicle 10 is traveling in an area where the speed limit is high, the controller 26 can set the safety zones 30, 42A, or 42B to extend a greater distance from the vehicles associated therewith to account for the additional stopping distance that may be necessary. Conversely, in an area where the speed limit is low or speed restrictions are in place (such as in a construction zone or school zone), the controller 26 can set the safety zones 30, 42A, or 42B to extend a shorter distance from the vehicles 10, 40A, 40B associated therewith.

The safety zones 30, 42A, 42B are set such that if encroached, likelihood of a collision will increase. The safety zones 30, 42A, and 42B are generally boundaries defined about the respective vehicles 10, 40A, and 40B respectively. Encroachment of the safety zones 30, 42A, and 42B is detected by the controller 26 based on inputs from the sensors 22. Upon determining that any of the safety zones 30, 42A, 42B have been encroached, the controller 26 activates the warning system 28.

The controller 26 is any suitable controller configured to provide the features described. For example, the controller 26 may include or be processor hardware (shared, dedicated, or group) that executes code, and the controller includes memory hardware (shared, dedicated, or group) that stores code executed by the processor hardware. The code is configured to provide the features of the controller 26 described.

The warning system 28 is configured to warn the driver of the secondary vehicle 40A that the secondary vehicle 40A has encroached the safety zone 30 of the subject vehicle 10, or the safety zone of another secondary vehicle 40B, as described herein and illustrated in FIGS. 5 and 6. The warning system 28 can include any suitable visual and/or audible warning emanating from the subject vehicle 10. For example, the warning system 28 can include a visual warning in the form of hazard lights 32, headlights, or any other warning lights of the subject vehicle 10. To generate the audible warning, the warning system can include, for example, a horn and/or speaker 34 of the vehicle 10. Any suitable audible warnings can be generated, such as non-semantic warnings, which may merely include sounding the horn and/or generating audible tones using the speaker.

Semantic warnings may also be generated, such as one or more of the following examples: "warning—vehicle in blind spot," "warning—vehicle approaching from left hand side," "warning—vehicle approaching from the right hand side," "warning—vehicle following closely behind," "warning—slower vehicle ahead," "warning—stopped vehicle ahead," "warning—vehicle entering roadway" (such as from a parking position alongside the road). The warnings may thus be directional, such as when the controller 26 is able to identify the exact or proximate position of the secondary vehicle 40A relative to the subject vehicle 10, or omnidirectional when based on the information available the controller 26 is unable to determine the exact location of the secondary vehicle 40A. The speech warnings can also be combined with tactile driver alerts (i.e., speech tacton alerts).

The intensity of the warning generated by the warning system 28 can vary based on the severity of the collision threat, which may be based on the size of the secondary vehicle 40A. For example, the warning system 28 may generate a medium intensity warning when the secondary vehicle 40A is sized similar to the subject vehicle 10. The warning system 28 may generate a high intensity warning when the secondary vehicle 40A is larger than the subject vehicle 10, such as when the secondary vehicle 40A is a large truck and the subject vehicle 10 is a smaller passenger vehicle. The warning system 28 may generate a low intensity warning when the secondary vehicle 40A is smaller than the subject vehicle 10, such as when the secondary vehicle 40A is a motorcycle and the subject vehicle 10 is a midsized passenger vehicle, for example. When two secondary vehicles 40A and 40B, as illustrated in FIG. 6, are encroaching the safety zones 42A/42B of one another, the warning system 28 may generate a medium intensity warning.

The intensity of the warnings can vary in any suitable manner. For example and with respect to the audible warnings, the high intensity audible warnings will be louder than the medium and low intensity warnings, the low intensity audible warnings will be not as loud as the high and medium intensity warnings, and the medium intensity audible warnings will be louder than the low intensity audible warnings, but not as loud as the high intensity audible warnings. The intensity of the visual warnings can be expressed in any suitable manner. For example, high intensity visual warnings can include illumination of all visual indicators, with all of the visual indicators flashing rapidly or being constantly illuminated. Low intensity visual warnings may include a single flash of the visual indicators, or blinking of the visual indicators set at a prolonged time interval. A medium intensity visual warning can be any suitable visual warning having an intensity that is less than the high intensity visual warning, but greater than the low intensity visual warning.

Figure 3:
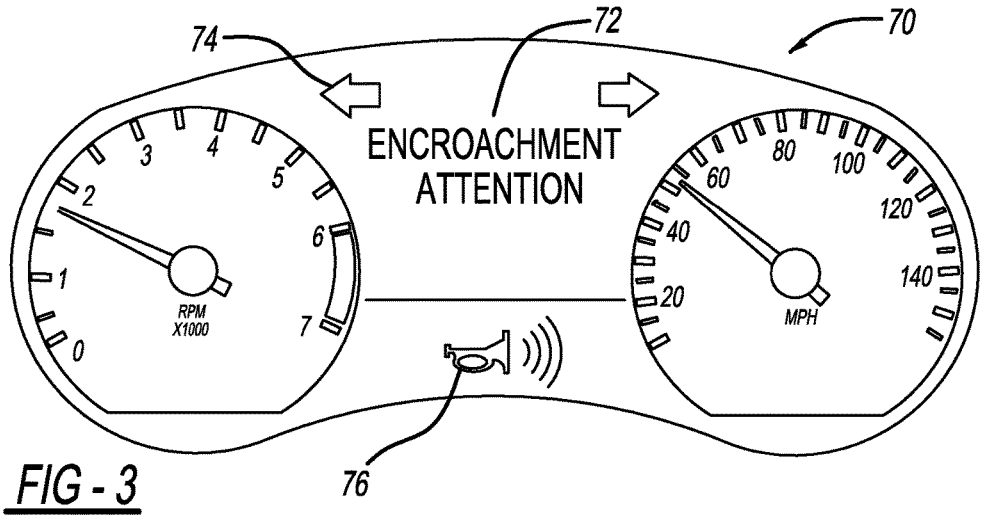
FIG. 3 illustrates an instrument panel of the subject vehicle displaying an alert to the driver that the safety zone of the subject vehicle has been encroached and that the alert has been activated.

The controller 26 is further configured to alert the driver of the subject vehicle 10 when the warning system 28 has been activated. For example and as illustrated in FIG. 3, instrument panel 70 of the subject vehicle 10 can display any suitable safety zone encroachment notification, such as a text alert 72 on the instrument panel 70. An indicator 74 of an active visual alert can also be included in the instrument panel 70, or can be provided in any other suitable manner. As illustrated in FIG. 3, the indicator 74 includes the directional or hazard indicators of the instrument panel 70. An additional indicator 76 of an active audible alert can also be included, such as in the instrument panel 70. In the example illustrated in FIG. 3, the indicator 76 is a horn icon, which includes intensity bars. The number of intensity bars illuminated can correspond to the intensity of the audible warning generated.

Figure 2:
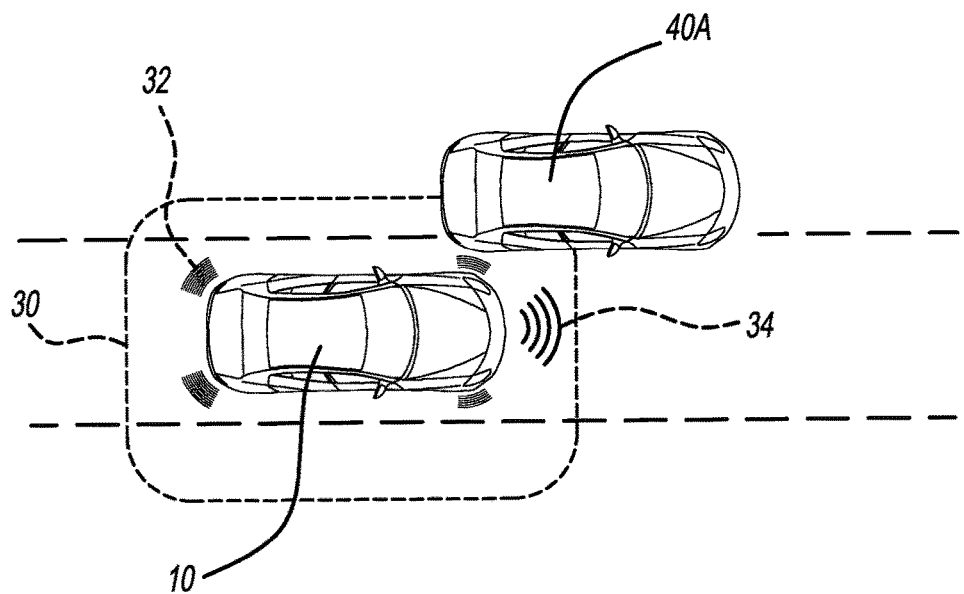
FIG. 2 illustrates a secondary vehicle encroaching the safety zone of a subject vehicle, and the subject vehicle generating an alert notifying the secondary vehicle of the encroachment.
Figure 4:
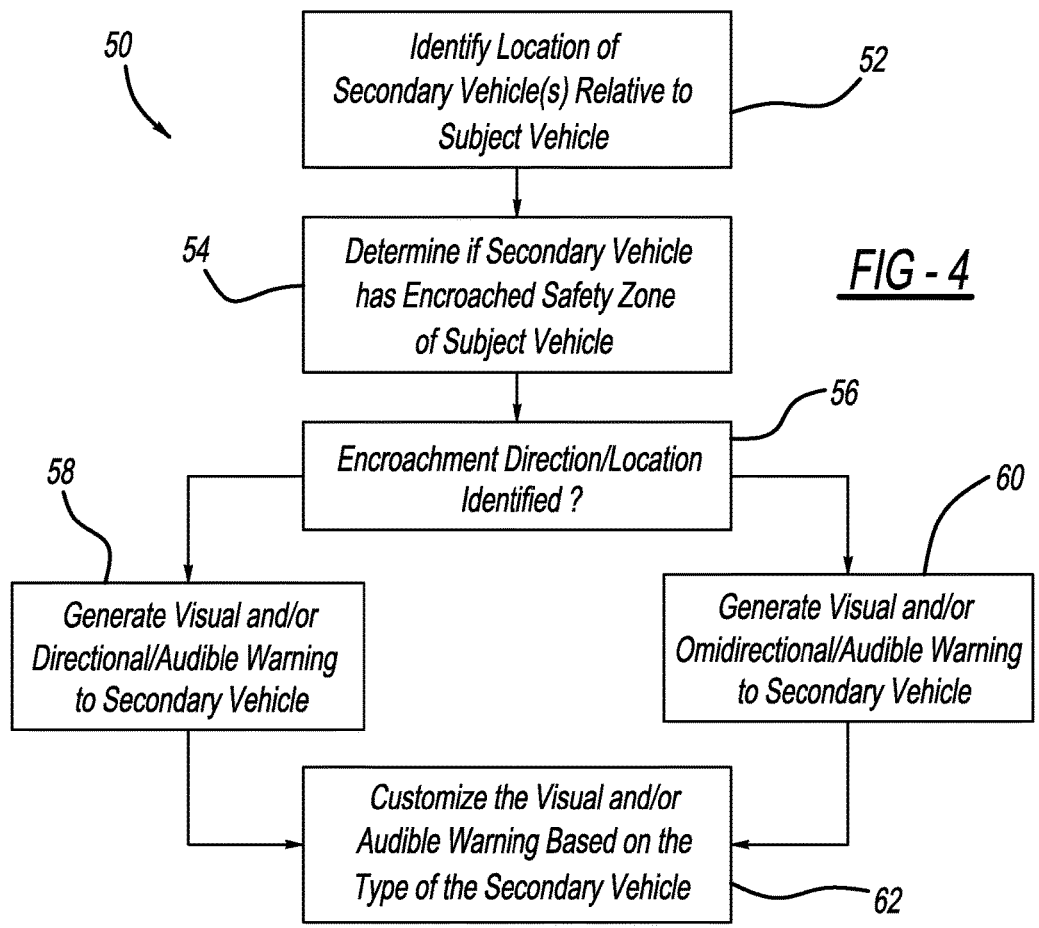
FIG. 4 illustrates a method according to the present teachings for alerting drivers that they have encroached the safety zone of another vehicle.

With continued reference to FIG. 1-3, and additional reference to FIG. 4, a method 50 according to the present teachings will now be discussed. The method 50 alerts a driver of a secondary vehicle 40A that the secondary vehicle 40A has encroached the safety zone 30 of the subject vehicle 10, or the safety zone 42B of another secondary vehicle 40B. With initial reference to block 52 of the method 50, the controller 26 identifies the location of the secondary vehicle 40A (and optionally additional secondary vehicles as well, such as secondary vehicle 40B) relative to the subject vehicle 10 based on data gathered by the sensors 22. At block 54, the controller 26 determines whether the secondary vehicle 40A has encroached the safety zone 30 of the subject vehicle 10. The distance that the safety zone 30 extends from the subject vehicle 10 is set by the controller 26 as explained above.

If the controller 26 determines that the safety zone 30 has been encroached, the method 50 proceeds to block 56. At block 56, the controller 26 attempts to identify the direction or location of the encroachment based on data gathered by the sensors 22. If the controller 26 is able to determine the direction/location of the encroachment, the method 50 proceeds to block 58. If the controller 26 is unable to identify the direction/location of the encroachment, the method 50 proceeds to block 60.

At block 58, the controller 26 activates the warning system 28 and instructs the warning system 28 to generate the visual and/or directional audible warnings to the secondary vehicle (such as secondary vehicles 40A and/or 40B) committing the encroachment, as described above. The visual and/or audible warnings can vary based on the size of the secondary vehicle 40A/40B relative to the subject vehicle 10, for example. The audible and/or visual warnings will be focused in the direction of the encroachment. At block 60, the controller 26 instructs the warning system 28 to generate a visual and/or omnidirectional audible and/or visual warning as explained above. From blocks 58 and 60, the method 50 proceeds to block 62.

At block 62, the controller 26 customizes the visual and/or audible warning based on the type of the secondary vehicle. For example and as explained above, if the secondary vehicle 40A is larger than the subject vehicle 10, the high intensity warning will be generated. If the secondary vehicle 40A is smaller than the subject vehicle 10, the low intensity warning will be generated. If the secondary vehicle 40A and the subject vehicle 10 are similar in size, the controller 26 instructs the warning system 28 to generate the medium intensity warning.

With additional reference to FIGS. 5 and 6, another method according to the present teachings is illustrated at reference numeral 110. The method 110 is for the subject vehicle 10 to alert the driver of the secondary vehicle 40A that the secondary vehicle 40A has encroached the safety zone 42B of another secondary vehicle 40B, alert the driver of secondary vehicle 40B that the secondary vehicle 40B has encroached safety zone 42A of secondary vehicle 40A, or alert the drivers of both secondary vehicles 40A/40B that they have infringed each other's safety zones 42A/42B.

The method 110 includes identifying location of at least two secondary vehicles, such as the secondary vehicles 40A and 40B, relative to each other at block 112. The controller 26 identifies the location of the secondary vehicles 40A and 40B relative to each other based on inputs from the sensors 22 of the subject vehicle 10. At block 114 the controller 26 determines if one or more of the secondary vehicles 40A and 40B have encroached the safety zones 42A or 42B of one another. Upon detection by the controller 26 of encroachment of safety zone 42A and/or 42B, the method 110 proceeds to block 116.

At block 116 the controller 26 commands the warning system 28 to generate visual and/or audible warnings to the secondary vehicles 40A and 40B. Any of the visual and/or audible warnings discussed above can be generated. If the controller 26 is able to identify which one of the secondary vehicles 40A or 40B is encroaching the safety zone 42A or 42B of the other, the controller 26 can instruct the warning system 28 to direct the warning, such as the audible warning as described above, towards the secondary vehicle 40A or 40B that has committed the encroachment. In this manner, the present teachings advantageously alert the drivers of the secondary vehicles 40A and 40B of a potential collision therebetween, thus allowing the secondary vehicles 40A and 40B to realize the benefits of the system 20 even though the secondary vehicles 40A and 40B are not equipped with their own driver assistance systems.

The present teachings advantageously allow the subject vehicle 10 to defend its own space by keeping drivers of secondary vehicles informed of their position relative to the subject vehicle 10, and alerting the drivers of the secondary vehicles 40A/40B when they have infringed the safety zone 30 of the subject vehicle 10. Thus even though the secondary vehicles 40A/40B may not be equipped with driver assistance systems, the system 20 of the subject vehicle 10 will alert the secondary vehicles 40A/40B when they encroach safety zone 30, thereby minimizing likelihood of any potential collision.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for a subject vehicle to alert a driver of a secondary vehicle that the secondary vehicle has encroached a safety zone of the subject vehicle or another secondary vehicle, the system for the subject vehicle comprising:
   sensors configured to identify location of the secondary vehicle relative to the subject vehicle when both the subject vehicle and the secondary vehicle are in motion;
   a controller in receipt of inputs from the sensors and configured to determine whether the secondary vehicle has encroached the safety zone of the subject vehicle or another secondary vehicle when neither one of the subject vehicle and the secondary vehicle is braking; and
   a warning system configured to warn the driver of the secondary vehicle that the secondary vehicle has encroached the safety zone of the subject vehicle or another secondary vehicle;
   wherein the controller activates the warning system when the controller determines that the secondary vehicle has encroached the safety zone of the subject vehicle or another secondary vehicle regardless of the relative speeds of the subject vehicle and the secondary vehicle.

2. The system of claim 1, wherein:
   the sensors include at least one of proximity sensors, lane detection sensors, traffic condition sensors, speed sensors, environmental condition sensors, and sensors configured to detect at least one of size and type of the secondary vehicle; and
   the sensors include at least one of cameras, radar, sonar, and lidar.

3. The system of claim 1, wherein the controller sets the safety zone based on at least one of traffic conditions, roadway restrictions, weather, and speed of at least one of the subject vehicle and secondary vehicles.

4. The system of claim 3, wherein the safety zone is set such that, if encroached, likelihood of a collision increases.

5. The system of claim 1, wherein the warning system includes at least one of warning lights, a horn, a semantic alert, and a speech tacton alert.

6. The system of claim 5, wherein the warning lights include external hazard lights.

7. The system of claim 1, wherein the warning system directs the warning in direction of the encroachment.

8. The system of claim 1, wherein the warning system is further configured to alert the driver of the subject vehicle that the safety zone of the subject vehicle or secondary vehicle has been encroached, and that the warning system of the subject vehicle has been activated.

9. The system of claim 1, further comprising a receiver configured to receive traffic information, weather information, road condition information, and obstacle information for use by the controller to set the safety zone; and
   wherein the receiver is configured to receive at least one of radio frequency signals and GPS signals.

10. The system of claim 1, wherein the controller is configured to vary the intensity of the warning generated by the warning system depending on the type of the secondary vehicle encroaching the safety zone of the subject vehicle, and based on whether the secondary vehicle is encroaching the safety zone of another secondary vehicle.

11. A method for a subject vehicle to alert a driver of a secondary vehicle that the secondary vehicle has encroached a safety zone of the subject vehicle or another secondary vehicle, the method comprising:
   identifying, with sensors of the subject vehicle, location of the secondary vehicle relative to the subject vehicle when both the subject vehicle and the secondary vehicle are in motion;
   determining whether the secondary vehicle has encroached the safety zone of the subject vehicle or another secondary vehicle when neither one of the subject vehicle and the secondary vehicle is braking based on data collected by the sensors; and
   warning the driver of the secondary vehicle with a warning system of the subject vehicle that the secondary vehicle has encroached the safety zone of the subject vehicle or another secondary vehicle regardless of the relative speeds of the subject vehicle and the secondary vehicle.

12. The method of claim 11, wherein the sensors include at least one of proximity sensors, lane detection sensors, traffic condition sensors, speed sensors, environmental condition sensors, and sensors configured to detect at least one of size and type of the secondary vehicle; and
   the sensors include at least one of cameras, radar, sonar, and lidar.

13. The method of claim 11, further comprising setting the safety zone based on at least one of traffic conditions, roadway restrictions, weather, and speed of at least one of the subject vehicle and secondary vehicles.

14. The method of claim 11, wherein the warning system includes at least one of warning lights, a horn, a semantic alert, and a speech tacton alert;
wherein the warning lights include external hazard lights.

15. The method of claim 11, further comprising directing the warning in a direction of the encroachment.

16. The method of claim 11, further comprising alerting the driver of the subject vehicle that the safety zone of the subject vehicle or secondary vehicle has been encroached, and that the warning system of the subject vehicle has been activated.

17. The method of claim 11, further comprising setting the safety zone based on traffic information received by a receiver of the subject vehicle.

18. The method of claim 11, further comprising varying intensity of the warning generated by the warning system depending on the type of the secondary vehicle encroaching the safety zone of the subject vehicle, and based on whether the secondary vehicle is encroaching the safety zone of another secondary vehicle.

19. The method of claim 11, further comprising generating a warning of a first intensity when the secondary vehicle is of a first size, and generating a warning of a second intensity when the secondary vehicle is of a second size;
wherein the second intensity is greater than the first intensity, and the second size is greater than the first size.

20. The method of claim 11, further comprising determining when two secondary vehicles are merging towards one another with the sensors of the subject vehicle, and using the warning of the subject vehicle to alert drivers of the two secondary vehicles when the safety zones of the two secondary vehicles have been encroached.

* * * * *